(12) United States Patent
Guo

(10) Patent No.: US 11,873,630 B2
(45) Date of Patent: Jan. 16, 2024

(54) PNEUMATIC VALVE CONTROL DEVICE

(71) Applicant: Kohler (China) Investment Co., Ltd., Shanghai (CN)

(72) Inventor: Bin Guo, Shanghai (CN)

(73) Assignee: Kohler (China) Investment Co., Ltd., Shanghai (CN)

( * ) Notice: Subject to any disclaimer, the term of this patent is extended or adjusted under 35 U.S.C. 154(b) by 0 days.

(21) Appl. No.: 18/083,975

(22) Filed: Dec. 19, 2022

(65) Prior Publication Data
US 2023/0193610 A1  Jun. 22, 2023

(30) Foreign Application Priority Data
Dec. 22, 2021  (CN) .......................... 202123254981.7

(51) Int. Cl.
*F16K 31/122* (2006.01)
*E03D 1/30* (2006.01)
*F16K 24/04* (2006.01)

(52) U.S. Cl.
CPC .......... *E03D 1/302* (2013.01); *F16K 31/1221* (2013.01); *F16K 31/1225* (2013.01); *F16K 24/04* (2013.01)

(58) Field of Classification Search
CPC ..................................................... E03D 1/302
See application file for complete search history.

(56) References Cited

U.S. PATENT DOCUMENTS

| 544,950 A | * | 8/1895 | Boucher | ............... F16K 31/124 |
| | | | | 137/496 |
| 2,626,633 A | * | 1/1953 | Wilson | ................ F16K 31/1221 |
| | | | | 251/73 |
| 2,760,204 A | * | 8/1956 | Joanis | ..................... E03D 5/024 |
| | | | | 4/367 |
| 4,734,201 A | | 3/1988 | Watanabe | |

(Continued)

FOREIGN PATENT DOCUMENTS

| CN | 203022093 U | 6/2013 |
| CN | 206916866 U | 1/2018 |

(Continued)

OTHER PUBLICATIONS

Extended European Search Report from European Patent Application No. 22215707.5, dated May 23, 2023, 5 pages.

*Primary Examiner* — Umashankar Venkatesan
(74) *Attorney, Agent, or Firm* — Lempia Summerfield Katz LLC

(57) ABSTRACT

A pneumatic valve control device includes an air cylinder. The air cylinder includes a first piston; an air outlet; and a locking and releasing mechanism configured to lock and release the first piston when the first piston is pushed up. The device also includes a hydraulic cylinder. The hydraulic cylinder includes a second piston; an air vent disposed on a first side of the second piston; and a liquid inlet and a liquid outlet disposed on a second side of the second piston. The device also includes a partition disposed between the hydraulic cylinder and the air cylinder; a partition channel disposed on the partition; a piston rod connected to the (Continued)

second piston and configured to pass through the partition channel; and a tappet valve connected to the piston rod and configured to leave the partition channel in response to an upward movement of the piston rod.

20 Claims, 8 Drawing Sheets

(56) References Cited

U.S. PATENT DOCUMENTS

| | | | |
|---|---|---|---|
| 4,840,347 A | 6/1989 | Ariizumi et al. | |
| 7,108,241 B2* | 9/2006 | Yoshino | F16K 41/12 |
| | | | 251/335.2 |
| 10,876,650 B2* | 12/2020 | Lund | F16K 31/1225 |
| 10,923,372 B2* | 2/2021 | Kawai | H01L 21/67389 |
| 2023/0058181 A1* | 2/2023 | Glime, III | F16K 31/1221 |
| 2023/0228343 A1* | 7/2023 | Ratti | F16K 41/103 |
| | | | 251/63.6 |
| 2023/0243438 A1* | 8/2023 | Lymberopoulos | F16K 1/52 |
| | | | 251/63.5 |

FOREIGN PATENT DOCUMENTS

| | | |
|---|---|---|
| CN | 211006913 U | 7/2020 |
| CN | 212248552 U | 12/2020 |
| CN | 212772653 U | 3/2021 |
| EP | 0890680 A1 | 1/1999 |
| WO | 2004090402 A1 | 10/2004 |

* cited by examiner

PNEUMATIC VALVE CONTROL DEVICE

CROSS REFERENCE TO RELATED APPLICATION

This application claims the benefit of priority to: Chinese Patent Application No. 202123254981.7 filed in the Chinese Intellectual Property Office on Dec. 22, 2021, which is hereby incorporated by reference in its entirety.

FIELD

The present disclosure relates to the technical field of pneumatic drain valve control, and particularly to a pneumatic valve control device.

BACKGROUND

A drain valve of a water tank of a toilet may be a mechanical drain valve or a pneumatic drain valve. In the pneumatic drain valve, a pneumatic force transmission mode is used with a pneumatic button to realize opening and closing actions of the drain valve. A pneumatic control mechanism is used to supply air to the pneumatic drain valve. An air inlet of the pneumatic drain valve is communicated with an air bag. After an action of the pneumatic control mechanism, the air is transmitted to the air bag through a hose, and a volume of the air bag is increased to drive an overflow pipe to rise. Thus, the pneumatic drain valve is opened to discharge water.

As to a structure and a working principle of the pneumatic drain valve, reference may be made to the Chinese application patent document with the publication number CN212248552U. As to a structure and a working principle of an air pressure driving device, reference may be made to the Chinese application patent document with the publication number CN206916866U.

A pneumatic valve control device needs to be pushed to move a larger stroke by an operator with a larger force to drive the pneumatic drain valve to open. Thus, it is inconvenient to operate to operate the pneumatic valve control device.

In view of the above technical problems, it is necessary to provide a pneumatic valve control device that is convenient to operate.

SUMMARY

The present disclosure aims to overcome the defects in the art and provide a pneumatic valve control device, which is convenient to operate.

The present disclosure provides a pneumatic valve control device, which comprises an air cylinder provided with a first piston and an air outlet and comprises a hydraulic cylinder provided with a second piston and an air vent.

A partition is arranged between the hydraulic cylinder and the air cylinder, and a partition channel is arranged on the partition.

A liquid inlet, a liquid outlet, and the air vent of the hydraulic cylinder are located on two opposite sides of the second piston, and the second piston is connected to a piston rod capable of passing through the partition channel.

The piston rod is connected to a tappet valve for opening and closing the partition channel, and the tappet valve is capable of withdrawing from the partition channel with an upward movement of the piston rod and jacking up (e.g., lifting up) the first piston.

The air cylinder further comprises a locking and releasing mechanism capable of locking and releasing the first piston that is jacked up or pushed up.

When the locking and releasing mechanism is unlocked and the first piston is in a descending state, the partition channel is in a closed state, and the air outlet is in an outward exhaust state.

In an embodiment, a sealing gasket is arranged in the partition channel.

When the tappet valve closes the partition channel, the tappet valve is contacted with the sealing gasket.

In an embodiment, a channel step surface is arranged in the partition channel, and the tappet valve is provided with a tappet valve step surface.

The sealing gasket is located on the channel step surface.

When the tappet valve closes the partition channel, the tappet valve step surface is pressed on the sealing gasket.

In an embodiment, a first elastic driving member for driving the first piston to reset is arranged in an air cylinder barrel of the air cylinder.

In an embodiment, a first sealing ring for sealing the air cylinder barrel is mounted on the first piston.

In an embodiment, a second elastic driving member for driving the second piston to reset is arranged in a hydraulic cylinder barrel of the hydraulic cylinder.

In an embodiment, a second sealing ring for sealing the hydraulic cylinder barrel is mounted on the second piston.

In an embodiment, the locking and releasing mechanism comprises a telescopic pin mounted on the air cylinder barrel of the air cylinder and comprises a driving portion for driving the telescopic pin to extend and retract, and the driving portion is connected to the telescopic pin.

In an embodiment, when the locking and releasing mechanism is in an initial state, the telescopic pin is in an extended state.

In an embodiment, the driving portion comprises a trigger pivotally mounted on the air cylinder barrel, one end of the trigger is connected to the telescopic pin, and a third elastic driving member is connected between the other end of the trigger and the air cylinder barrel.

In an embodiment, a limiting convex portion is arranged on one side of the first piston oriented to the telescopic pin.

A convex portion inclined plane for guiding the telescopic pin to retract is arranged on the limiting convex portion, and the convex portion inclined plane gradually and obliquely extends upwardly and inwardly in a direction from the telescopic pin to the limiting convex portion.

In an embodiment, a bottom surface of the limiting convex portion is a plane.

In an embodiment, the limiting convex portion is a limiting ring arranged on the first piston.

In an embodiment, an area of the liquid inlet is larger than that of the liquid outlet.

The present disclosure may have the following beneficial effects.

According to the pneumatic valve control device according to the present disclosure, when the hydraulic cylinder is filled with a liquid, the tappet valve withdraws from a top of the partition channel to jack up the first piston, and air enters the cavity of the air cylinder through the air vent and the partition channel. When the first piston rises to a preset position, the locking and releasing mechanism locks the first piston, the hydraulic cylinder discharges the liquid, the tappet valve resets to close the partition channel, and at the moment, the cavity of the air cylinder is in a sealed state. When the locking and releasing mechanism releases the first piston, the first piston descends, and air is discharged through the air outlet, which may be discharged into the pneumatic drain valve connected to the air outlet to make the pneumatic drain valve open and discharge water.

By using the pneumatic valve control device according to the present disclosure, when water enters the water tank, the hydraulic cylinder is automatically filled with the liquid and jacks up or pushes up the first piston to the preset position, and the first piston is locked by the locking and releasing mechanism. When the water stops entering the water tank, the hydraulic cylinder discharges the liquid, and the tappet valve automatically resets to close the partition channel, so that the cavity of the air cylinder can be in the sealed state. When a user needs to discharge the water, the user only needs to simply operate the locking and releasing mechanism, which automatically releases the first piston, and the air is pressed into the pneumatic drain valve to allow the pneumatic drain valve to open and discharge the water.

Therefore, the pneumatic valve control device according to the present disclosure is more labor-saving and convenient to operate and may improve a performance of products.

BRIEF DESCRIPTION OF THE FIGURES

With reference to the drawings, the contents disclosed by the present disclosure should be more easily understood. It should be understood that these drawings are merely used for illustration and are not intended to limit the protection scope of the present disclosure. In the drawings.

DETAILED DESCRIPTION

Figure 1:
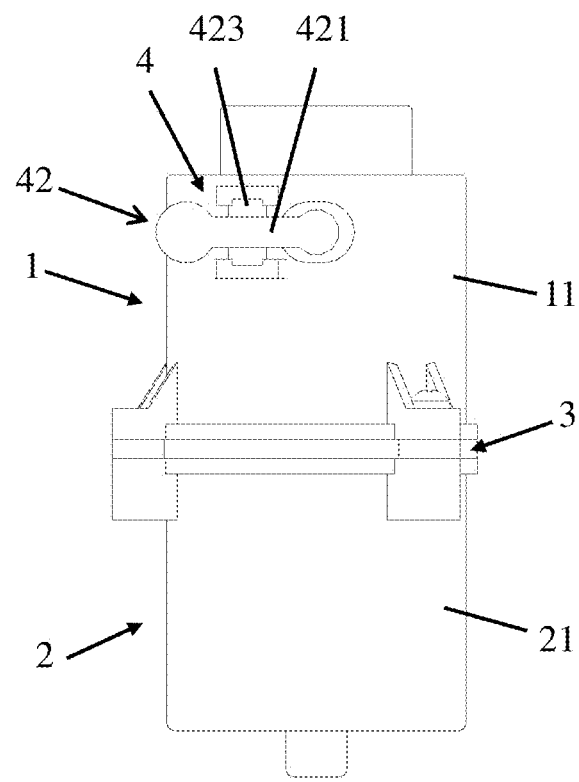
FIG. 1 is a front view of a pneumatic valve control device according to an example of the present disclosure.

The specific embodiments of the present disclosure are further described with reference to the drawings hereinafter. Same or equivalent parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

Figure 2:
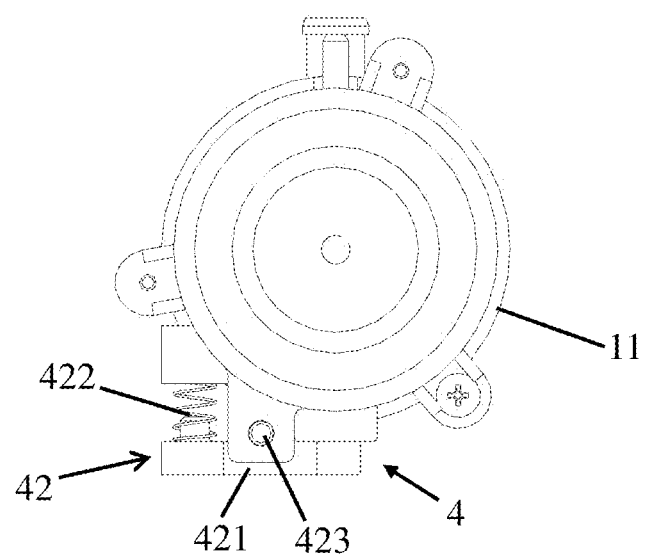
FIG. 2 is a top view of the pneumatic valve control device according to the example of the present disclosure.
Figure 3:
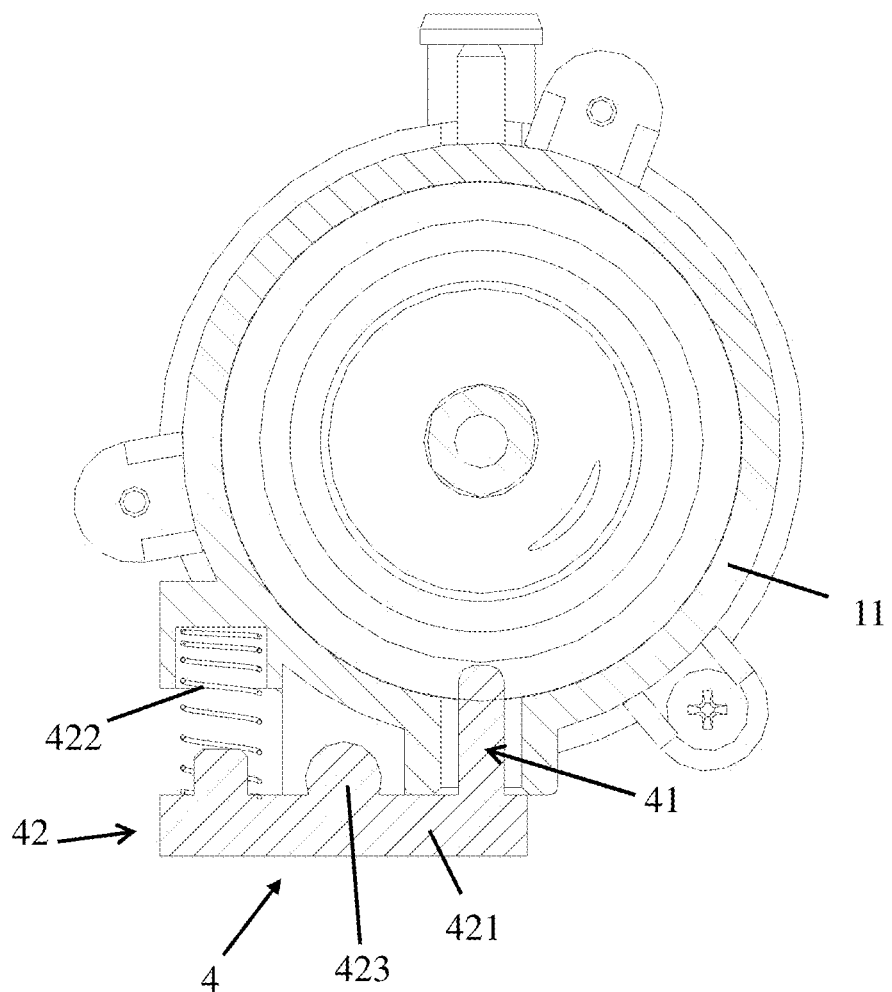
FIG. 3 is a sectional view of the pneumatic valve control device according to an example of the present disclosure along a telescopic pin.
Figure 4:
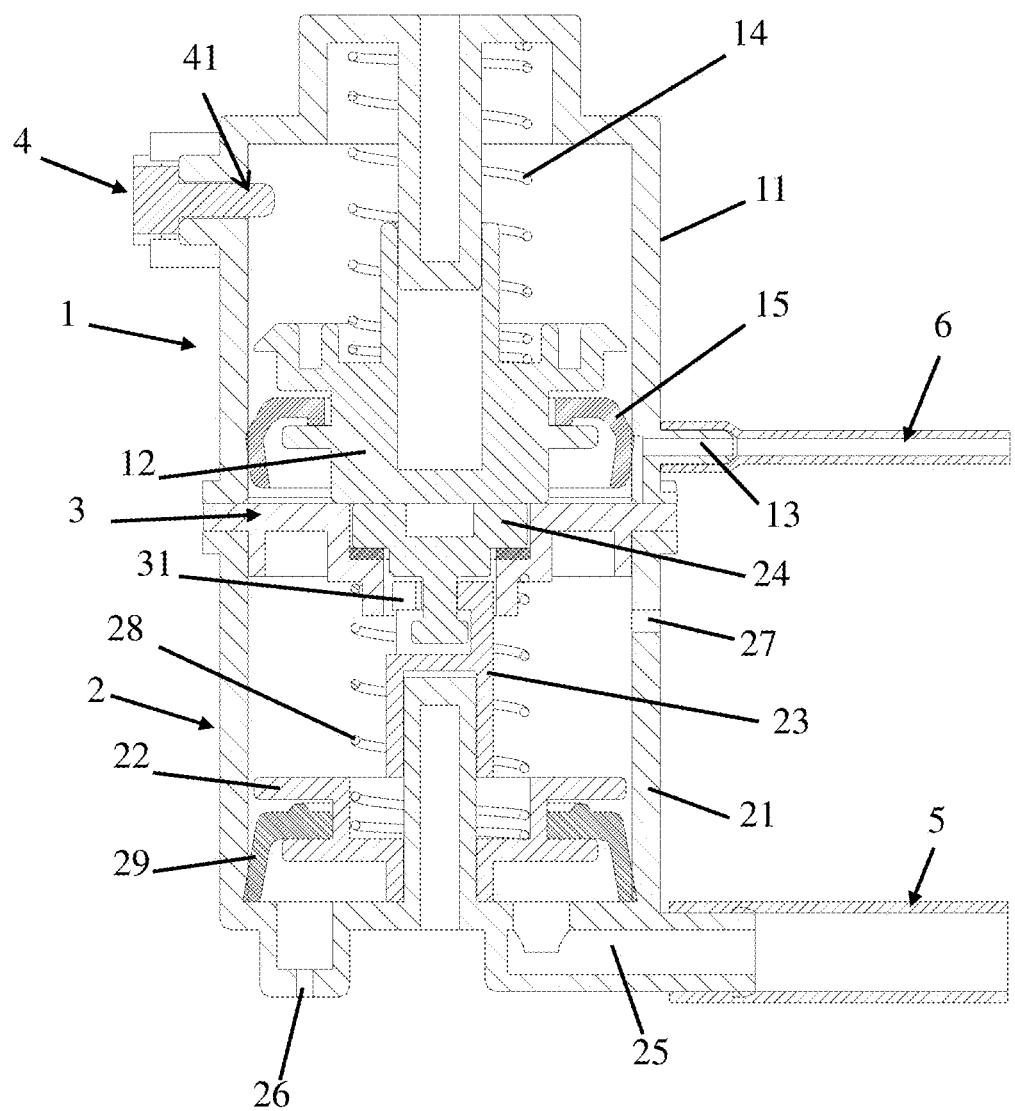
FIG. 4 is a sectional view of the pneumatic valve control device according to an example of the present disclosure, wherein a second piston is in an initial state, a tappet valve seals a partition channel, and a first piston is located at a lowest position.
Figure 5:
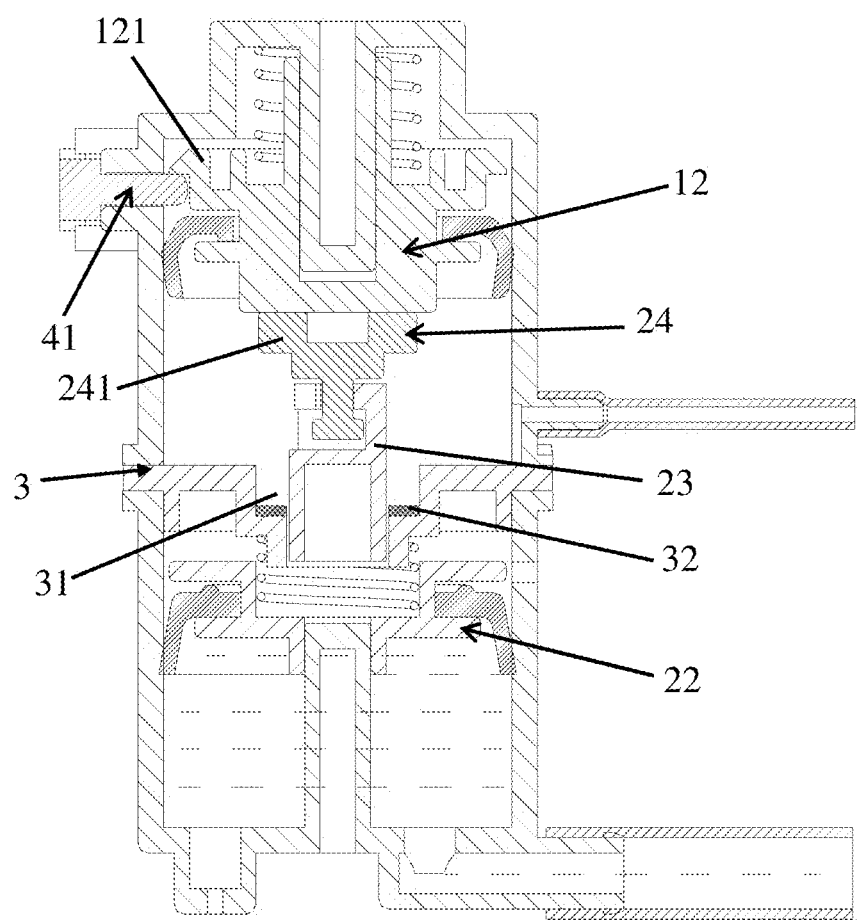
FIG. 5 is a sectional view of the pneumatic valve control device according to an example of the present disclosure, wherein the second piston is in a rising state, the tappet valve jacks up or pushes up the first piston, and the first piston is locked by a locking and releasing mechanism.
Figure 6:
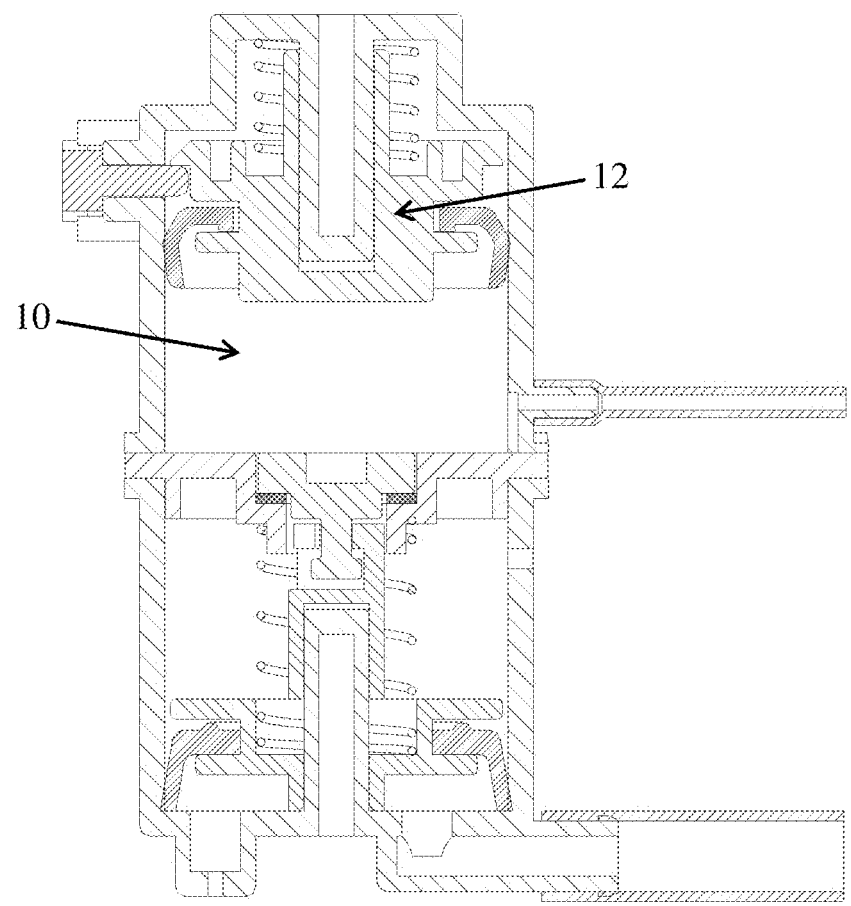
FIG. 6 is a sectional view of the pneumatic valve control device according to an example of the present disclosure, wherein the second piston resets to the initial state, the tappet valve seals the partition channel, and the first piston is locked by the locking and releasing mechanism.
Figure 7:
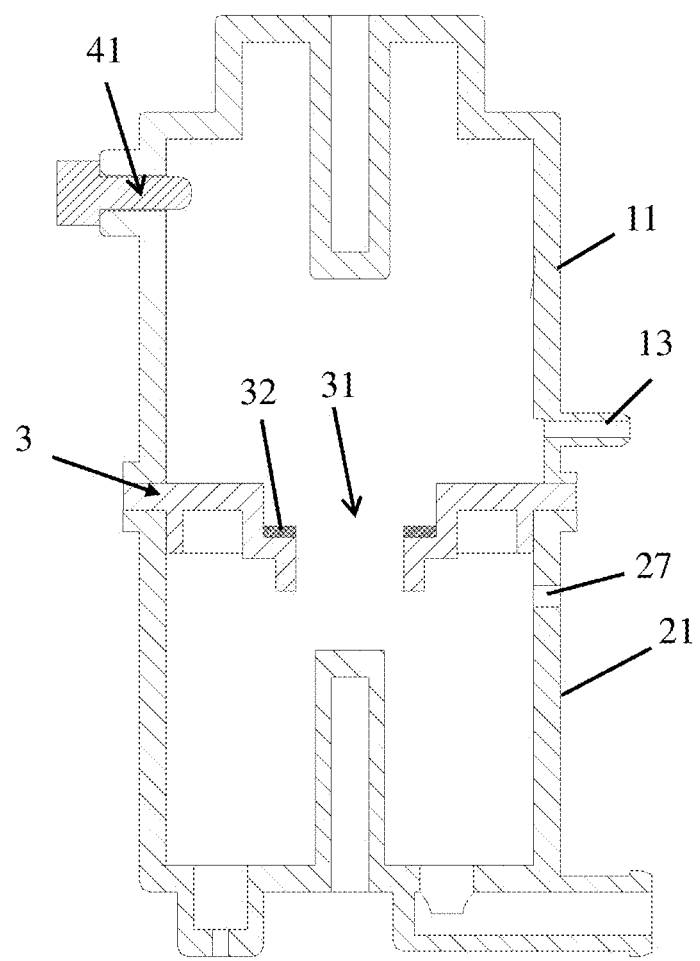
FIG. 7 is a sectional view of an air cylinder barrel, a partition, and a hydraulic cylinder barrel.

FIG. 1 is a front view of a pneumatic valve control device according to an example of the present disclosure. FIG. 2 is a top view of the pneumatic valve control device according to the example of the present disclosure. FIG. 3 is a sectional view of the pneumatic valve control device according to an example of the present disclosure along a telescopic pin. FIG. 4 is a sectional view of the pneumatic valve control device according to an example of the present disclosure, wherein a second piston is in an initial state, a tappet valve seals a partition channel, and a first piston is located at a lowest position. FIG. 5 is a sectional view of the pneumatic valve control device according to an example of the present disclosure, wherein the second piston is in a rising state, the tappet valve jacks up or pushes up the first piston, and the first piston is locked by a locking and releasing mechanism. FIG. 6 is a sectional view of the pneumatic valve control device according to an example of the present disclosure, wherein the second piston resets to the initial state, the tappet valve seals the partition channel, and the first piston is locked by the locking and releasing mechanism. FIG. 7 is a sectional view of an air cylinder barrel, a partition, and a hydraulic cylinder barrel.

As shown in FIG. 1-FIG. 7, a pneumatic valve control device according to an embodiment of the present disclosure comprises an air cylinder 1 with a first piston 12 and an air outlet 13 and a hydraulic cylinder 2 with a second piston 22 and an air vent 27.

A partition 3 is arranged between the hydraulic cylinder 2 and the air cylinder 1, and a partition channel 31 is arranged on the partition 3.

A liquid inlet 25 and a liquid outlet 26 of the hydraulic cylinder 2 are located on a first side of the second piston 22 and the air vent 27 of the hydraulic cylinder 2 is located on a second side (e.g., opposite to the first side) of the second piston 22, and the second piston 22 is connected to a piston rod 23 configured to pass through the partition channel 31.

The piston rod 23 is connected to a tappet valve 24 for opening and closing the partition channel 31, and the tappet valve 24 is configured to withdraw from the partition channel 31 with an upward movement of the piston rod 23 and jack (e.g., push) up the first piston 12.

The air cylinder 1 further comprises a locking and releasing mechanism 4 configured to lock and release the first piston 12, which has been jacked up or pushed up.

When the locking and releasing mechanism 4 is unlocked and the first piston 12 is in a descending, falling back state, the partition channel 31 is in a closed state, and the air outlet 13 is in an outward exhaust state.

The pneumatic valve control device according to the embodiment may be used for controlling a pneumatic drain valve in a toilet.

The pneumatic valve control device comprises the air cylinder 1, the hydraulic cylinder 2, the partition 3, and the locking and releasing mechanism 4.

The partition 3 is sealed between an air cylinder barrel 11 and a hydraulic cylinder barrel 21, and a partition channel 31 is arranged on the partition 3 and configured to connect an air cavity of the air cylinder 1 to an air cavity of the hydraulic cylinder 2. According to needs, the air cylinder barrel 11 and the hydraulic cylinder barrel 21 may have an integrated structure, and the partition 3 is sealed in the cavities of the air cylinder barrel 11 and the hydraulic cylinder barrel 21.

The first piston 12 is arranged in the air cylinder 11, the air outlet 13 is arranged in a barrel wall of the air cylinder barrel 11, and the air outlet 13 may be connected to an air inlet of the pneumatic drain valve through a pipeline 6.

The second piston 22 is arranged in the hydraulic cylinder barrel 21, the second piston 22 is connected to the piston rod 23, the piston rod 23 may pass through the partition channel 31, and the piston rod 23 is in clearance fit with the partition channel 31. The piston rod 23 is connected to the tappet valve 24. A bottom portion of the hydraulic cylinder 21 is provided with the liquid inlet 25 and the liquid outlet 26, and a middle and upper portion of the hydraulic cylinder 21 is provided with the air vent 27. The liquid inlet 25 may be connected to a water inlet pipe of a water tank of the toilet through a pipeline 5. The liquid outlet 26 is configured to discharge water and may optionally discharge the water into the water tank of the toilet.

Because the tappet valve 24 has a valve function and a tappet function (e.g., as noted above, the tappet valve 24 is configured to withdraw from the partition channel 31 with an upward movement of the piston rod 23 and jack or push up the first piston 12) at the same time, the tappet valve 24 is called a tappet valve. The functions are specifically described as follows.

Firstly, when the second piston 22 is in an initial state, the tappet valve 24 is at least partially located in the partition channel 31 to close the partition channel 31. At the moment, the air vent 27 is disconnected from the air cavity 10 of the air cylinder 1, and no ventilation is allowed.

Secondly, when water enters the liquid inlet 25 to achieve liquid filling, the hydraulic cylinder 2 acts in response to the liquid filling, the second piston 22 is jacked up or pushed up by the water below the second piston 22, the tappet valve 24 rises with the piston rod 23 and leaves from the partition channel 31, and the first piston 12 is jacked up or pushed up. At the moment, the air vent 27 is in air communication with the air cavity 10 of the air cylinder 1 through the partition channel 31 to supplement air to the air cavity 10.

The locking and releasing mechanism 4 is located at a middle and upper portion of a first cylinder barrel 11 and configured to lock the first piston 12 in a rising state. A lock pin, a lock claw, a lock catch, or the like may be selected as the locking and releasing mechanism 4. The locking and releasing mechanism 4 may be controlled electrically or manually.

When the first piston 12 is jacked up or pushed up to a preset position by the tappet valve 24, the locking and releasing mechanism 4 acts to lock the first piston 12, so that the first piston cannot descend.

When the water stops entering the liquid inlet 25, and the water is discharged through the liquid outlet 26, the second piston 22 gradually descends back to an initial position. Accordingly, the tappet valve 24 resets to close the partition channel 31. At the moment, the first piston 12 is kept at a higher position, and the air cavity 10 has a largest volume and is in a closed state.

When a user needs to open the pneumatic drain valve, the user operates the locking and releasing mechanism 4, so that the locking and releasing mechanism 4 releases the first piston 12, and the first piston 12 descends and compresses the air in the air cavity 10 out through the air outlet 13. The compressed air enters the pneumatic drain valve through the pipeline 6, the pneumatic drain valve is opened, and the water tank discharges water.

Therefore, the pneumatic valve control device according to the present disclosure is more labor-saving and convenient to operate and improves a performance of products.

In an embodiment, as shown in FIG. 4-FIG. 7, a sealing gasket 32 is arranged in the partition channel 31. When the tappet valve 24 closes the partition channel 31, the tappet valve 24 is contacted with the sealing gasket 32.

The sealing gasket 32 is a rubber gasket. When the tappet valve 24 is in an initial state, the tappet valve is contacted and sealed with the sealing gasket 32. Thus, a sealing effect may be improved and the air in the air cavity 10 may be prevented from leaking.

In an embodiment, as shown in FIG. 4-FIG. 7, a channel step surface is arranged in the partition channel 31, and the tappet valve 24 is provided with a tappet valve step surface 241. The sealing gasket 32 is located on the channel step surface.

When the tappet valve 24 closes the partition channel 31, the tappet valve step surface 241 presses the sealing gasket 32.

This arrangement not only is convenient for mounting the sealing gasket 32, but also is convenient for matching the tappet valve 24 with the sealing gasket 32 to achieve sealing.

In an embodiment, as shown in FIG. 4, FIG. 5, and FIG. 6, a first elastic driving member 14 configured to drive the first piston 12 to reset is arranged in the air cylinder barrel 11 of the air cylinder 1. A spring, an elastic sheet, or the like may be selected as the first elastic driving member 14. After the locking and releasing mechanism 4 releases the first piston 12, the first elastic driving member 14 facilitates or accelerate a quick descent or a downward movement of the first piston 12, so as to increase a pressure of the air in the air cavity 10 and allow the air to quickly flow into the pneumatic drain valve. Thus, the pneumatic drain valve may be quickly opened.

In an embodiment, as shown in FIG. 4, FIG. 5, and FIG. 6, a first sealing ring 15 configured to seal the air cylinder barrel 11 of the air cylinder 1 is mounted on the first piston 12. The first sealing ring 15 is a rubber sealing ring and plays a role in sealing the first piston 12 with the air cylinder barrel 11. Thus, the air in the air cavity 10 may be prevented from leaking.

In an embodiment, as shown in FIG. 4, FIG. 5, and FIG. 6, a second elastic driving member 28 configured to drive the second piston 22 to reset (e.g., a downward movement) is arranged in the hydraulic cylinder barrel 21 of the hydraulic cylinder 2. A spring, an elastic sheet, or the like may be selected as the second elastic driving member 28. After the water stops entering the liquid inlet 25, the second elastic driving member 28 facilitates or accelerates the downward reset of the second piston 22, so that the tappet valve 24 can quickly return to seal or close the partition channel 31. Thus, the air in the air cavity 10 discharged through the partition channel 31 may be reduced.

In an embodiment, as shown in FIG. 4, FIG. 5, and FIG. 6, a second sealing ring 29 configured to seal the hydraulic cylinder barrel 21 is mounted on the second piston 22. The second sealing ring 29 is a rubber sealing ring and plays a role in sealing the second piston 22 with the hydraulic cylinder barrel 21. Thus, the water may be prevented from entering the air cavity above the second piston 22.

In an embodiment, as shown in FIG. 1-FIG. 7, the locking and releasing mechanism 4 comprises a telescopic pin 41 mounted on the air cylinder barrel 11 of the air cylinder 1. The locking and releasing mechanism 4 also comprises a driving portion 42 configured to drive the telescopic pin 41 to extend and retract, and the driving portion 42 is connected to the telescopic pin 41.

In the embodiment, the locking and releasing mechanism 4 includes the telescopic pin 41 and the driving portion 42.

The telescopic pin 41 extends along a radial direction of the air cylinder barrel 11 and may pass through the air cylinder barrel 11 to extend into an inner side of the air cylinder barrel 11, so as to lock the first piston 12. The driving portion 42 may be an electrically controlled driving portion or a mechanical driving portion. The driving portion 42 is configured to drive the telescopic pin 41 to extend and retract in the air cylinder barrel 11. When the first piston 12 needs to be released, the telescopic pin 41 may be driven to retract away from the first piston 12 by operating the driving portion 42, and then the first piston 12 may descend.

In an embodiment, as shown in FIG. 1-FIG. 7, when the locking and releasing mechanism 4 is in an initial state, the telescopic pin 41 is in an extended state.

In the embodiment, in a usual state, the telescopic pin 41 is in the extended state. When the first piston 12 is jacked up or pushed up, the telescopic pin 41 may retract automatically. After the first piston passes over the telescopic pin 41, the telescopic pin 41 extends again, and the descended first piston 12 may be locked by the extended telescopic pin 41. This is a convenient operation.

In an embodiment, as shown in FIG. 2 and FIG. 3, the driving portion 42 comprises a trigger 421 pivotally mounted on the air cylinder barrel 11, one end of the trigger 421 is connected to the telescopic pin 41, and a third elastic driving member 422 is connected between the other end of the trigger 421 and the air cylinder barrel 11.

In the embodiment, the driving portion 42 includes the trigger 421 with a mechanical structure and the third elastic driving member 422. The trigger 421 is mounted on an outer side of the air cylinder barrel 11 through a pivot shaft 423, and the pivot shaft 423 is parallel to an axis of the air cylinder barrel 11. The trigger 421 may rotate around the pivot shaft 423. A mounting portion is arranged on the air cylinder barrel 11, the third elastic driving member 422 is connected between the mounting portion and one end of the trigger 421, and the other end of the trigger 421 is connected to the telescopic pin 41. An expansion spring, an elastic sheet, or the like may be selected as the third elastic driving member 422. In a usual state, the third elastic driving member 422 acts on the trigger 421, so that the trigger 421 drives the telescopic pin 41 to be in the extended state. This means that an end portion of the telescopic pin 41 extends into the air cylinder barrel 11.

When the user needs to open the pneumatic drain valve, the user may press the trigger 421 to compress the third elastic driving member 422, so that the trigger 421 drives the telescopic pin 41 to move outwardly to retract and withdraw from the first piston 12. Thus, the first piston 12 may be released.

According to needs, a through hole may be formed in the water tank of the toilet, and the trigger 421 extends out of an outer side of the water tank of the toilet through the through hole or is flush or leveled with a surface of the water tank of the toilet, as long as the user can press the trigger 421.

In an embodiment, as shown in FIG. 4, FIG. 5, FIG. 6, and FIG. 8, a limiting convex portion 121 is arranged on one side of the first piston 12 oriented to the telescopic pin 41.

A convex portion inclined plane 1211 configured to guide the telescopic pin 41 to retract is arranged on the limiting convex portion 121, and the convex portion inclined plane 1211 gradually and obliquely extends upwardly and inwardly in a direction from the telescopic pin 41 to the limiting convex portion 121.

In the embodiment, the limiting convex portion 121 is arranged on the first piston 12. The limiting convex portion 121 is convex along a radial direction of the first piston 12.

When the first piston 12 is jacked up or pushed up to a position below the telescopic pin 41, the end portion of the telescopic pin 41 is contacted with the convex portion inclined plane 1211, and the first piston 12 continues to move up, so that the convex portion inclined plane 1211 will act on the telescopic pin 41 to retract the telescopic pin 41 automatically. After the limiting convex portion 121 passes over the telescopic pin 41, the telescopic pin 41 extends out. When the first piston 12 descends, the telescopic pin 41 blocks a bottom surface of the limiting convex portion 121 to prevent the first piston 12 from descending.

Figure 8:
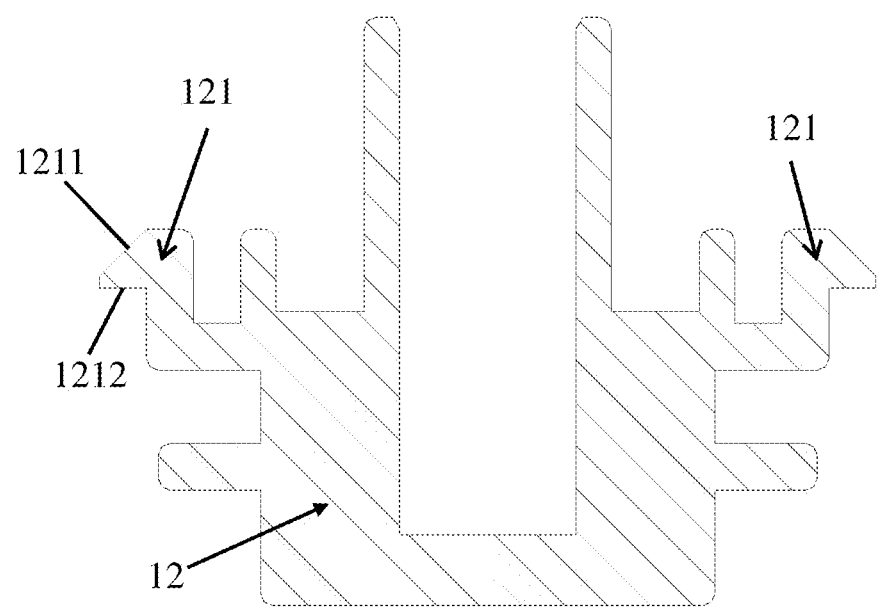
FIG. 8 is a sectional view of the first piston.

In an embodiment, as shown in FIG. 8, a bottom surface of the limiting convex portion 121 is a plane 1212, which is advantageous to match the telescopic pin 41 with the plane 1212 to realize a locking function.

In an embodiment, the limiting convex portion 121 is a limiting ring arranged on the first piston 12, and the user may arrange the telescopic pin 41 at any position along a circumferential direction of the air cylinder barrel 11 as needed.

In an embodiment, an area of the liquid inlet 25 is larger than that of the liquid outlet 26. This arrangement may keep the liquid inlet 25 and the liquid outlet 26 open normally, without a need to control the liquid outlet 26 separately. This is advantageous to simplify a structure of products. The area of the liquid inlet 25 and the area of the liquid outlet 26 may be set as needed. The above technical solutions may be combined as required to achieve the best technical effect.

An embodiment of the present disclosure provides a toilet, which comprises the pneumatic valve control device according to any one of the embodiments above.

In an embodiment, the toilet includes a base (e.g., a pedestal, bowl, etc.) and a tank. The base is configured to be attached to another object such as a drainpipe, floor, or another suitable object. The base includes a bowl, a sump (e.g., a receptacle) disposed below the bowl, and a trapway fluidly connecting the bowl to a drainpipe or sewage line. The tank may be supported by the base, such as an upper surface of a rim. The tank may be integrally formed with the base as a single unitary body. In other embodiments, the tank may be formed separately from the base and coupled (e.g., attached, secured, fastened, connected, etc.) to the base. The toilet may further include a tank lid covering an opening and inner cavity in the tank. The toilet may include a seat assembly including a seat and a seat cover rotatably coupled to the base. The toilet may further include a hinge assembly.

In another embodiment, the toilet may be a tankless toilet. The toilet includes a base and a seat assembly coupled to the base. The base includes a bowl, a sump disposed below the bowl, and a trapway fluidly connecting the bowl to a drainpipe or sewage line. The toilet includes a waterline that supplies the toilet with water. The toilet may further include a seat assembly including a seat and a seat cover rotatably coupled to the base. The toilets described above are provided herein as non-limiting examples of toilets that may be configured to utilize aspects of the present disclosure.

In some examples, the bidet may be included in a seat or pedestal of a toilet. In other examples, the bidet may be manufactured separately from and attached or coupled to a seat or pedestal of a toilet. The bidet includes a housing. The housing is configured to receive a flow of water through a housing inlet and dispense the flow of water from a housing outlet. The housing inlet and housing outlet may be located on opposite ends of the housing from one another, such that water may flow through the housing from the housing inlet to the housing outlet. In some examples, the housing further includes a chamber. As the housing receives the flow of water, the chamber may fill with water and provide a flow of water between the housing inlet and the housing outlet. The chamber may be configured to contain the flow of water and direct the flow of water from the housing inlet to the housing outlet. After the chamber has filled with water, the flow of water may travel along a substantially linear path between the housing inlet and the housing outlet. In some examples, one or more walls within the housing may be included to help direct a flow of water between the housing inlet and the housing outlet. The bidet may further include a housing inlet conduit configured to direct a flow of water to the housing inlet. The housing inlet conduit may be coupled to a water supply such as tank or waterline. The housing may further include a gear assembly or a portion of the gear assembly.

Figure 9:
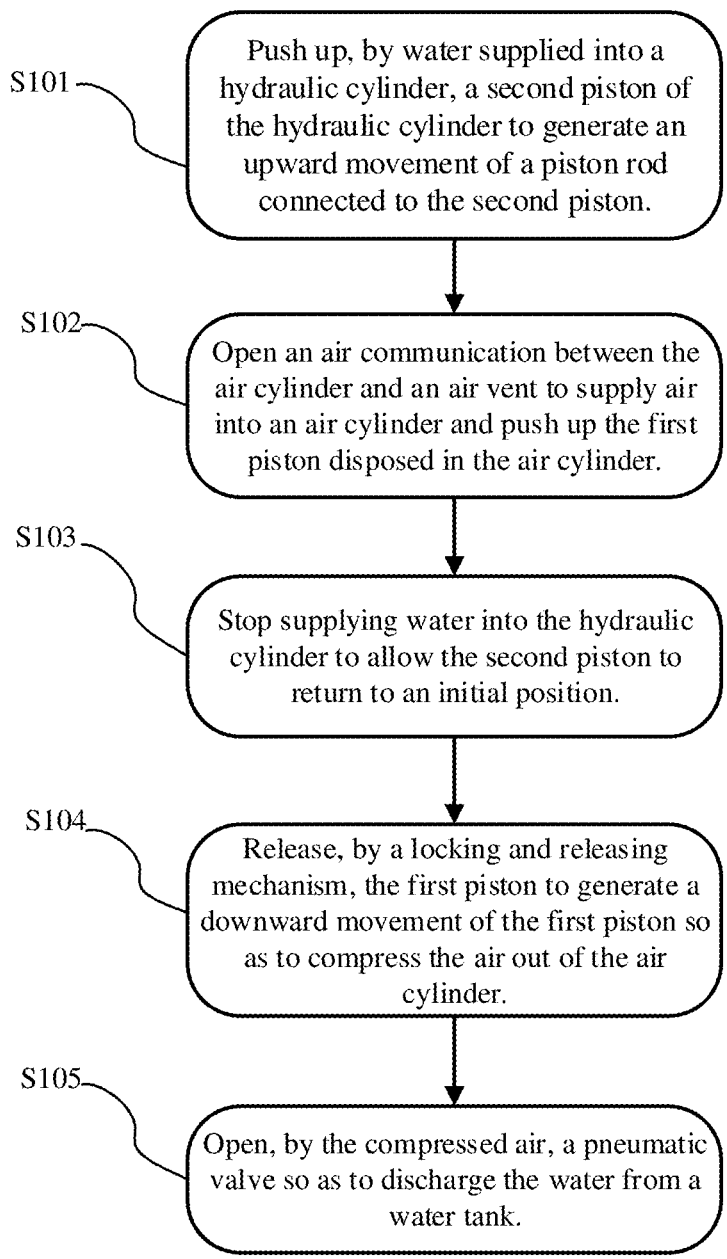
FIG. 9 is a flow chart of a method for controlling a pneumatic valve to release water in a water tank of a toilet by using a pneumatic valve control device according to an example of the present disclosure.

FIG. 9 is a flow chart of a method for controlling a pneumatic valve to release water in a water tank of a toilet by using a pneumatic valve control device according to an example of the present disclosure. The pneumatic valve control device used by the method may be the pneumatic valve control device according to any of the foregoing embodiments and may be configured to perform an operation, function, or the like as described in the present disclosure. The pneumatic valve controlled by the method may be the pneumatic valve according to any of the foregoing embodiments and may be configured to perform an operation, function, or the like as described in the present disclosure.

At act S101, the water supplied into the hydraulic cylinder 2 may push up the second piston 22 to generate an upward movement of the piston rod 23 connected to the second piston 22. As noted above, when the water enters the liquid inlet 25 to achieve liquid filling, the hydraulic cylinder 2 acts in response to the liquid filling, the second piston 22 is pushed up by the water below the second piston 22, and the tappet valve 24 rises with the piston rod 23 and leaves from the partition channel 31.

At act S102, the upward movement of the piston rod 23 may open an air communication between the air cylinder 1 and the air vent 27 to supply air into the air cylinder 1 and may push up the first piston 12 disposed in the air cylinder 1. As noted above, the air vent 27 is in air communication with the air cavity 10 of the air cylinder 1 through the partition channel 31 to supplement air to the air cavity 10 when the tappet valve 24 rises with the piston rod 23 and leaves from the partition channel 31.

At act S103, the liquid inlet 25 may stop supplying the water into the hydraulic cylinder 2 to allow the second piston 22 to return to an initial position. As noted above, when the water stops entering the liquid inlet 25, and the water is discharged through the liquid outlet 26, the second piston 22 gradually descends back to an initial position. Accordingly, the tappet valve 24 resets to close the partition channel 31. At this time, the first piston 12 is kept at a higher position, and the air cavity 10 has a largest volume and is in a closed state.

At act S104, the locking and releasing mechanism 4 may release the first piston 12 to generate a downward movement of the first piston 12 so as to compress the air out of the air cylinder 1. As noted above, to open the pneumatic drain valve, the locking and releasing mechanism 4 may be operated, so that the locking and releasing mechanism 4 releases the first piston 12, and the first piston 12 descends and compresses the air in the air cavity 10 out through the air outlet 13.

At act S105, the compressed air may open the pneumatic valve so as to discharge the water from the water tank. As noted above, the compressed air enters the pneumatic drain valve through the pipeline 6, the pneumatic drain valve is opened, and the water tank discharges water.

The above description is merely the principle and the embodiments of the present disclosure. It should be pointed out that, for those of ordinary skill in the art, several other modifications may be made based on the principle of the present disclosure and should also be regarded as falling within the protection scope of the present disclosure.

I claim:

1. A pneumatic valve control device, comprising:
   an air cylinder including a first piston, an air outlet, and a locking and releasing mechanism configured to lock and release the first piston when the first piston is pushed up;
   a hydraulic cylinder including a second piston, an air vent disposed on a first side of the second piston, and a liquid inlet and a liquid outlet disposed on a second side of the second piston;
   a partition disposed between the hydraulic cylinder and the air cylinder;
   a partition channel disposed on the partition;
   a piston rod connected to the second piston and configured to pass through the partition channel; and
   a tappet valve connected to the piston rod, the tappet valve configured to open and close the partition channel and configured to leave the partition channel in response to an upward movement of the piston rod so as to push up the first piston,
   wherein when the locking and releasing mechanism is released, the first piston falls down, the partition channel is in a closed state, and the air outlet is in an outward air exhaust state.

2. The pneumatic valve control device according to claim 1,
   wherein a sealing gasket is disposed in the partition channel, and
   wherein when the tappet valve closes the partition channel, the tappet valve is contacted with the sealing gasket.

3. The pneumatic valve control device according to claim 2,
   wherein a channel step surface is disposed in the partition channel and the sealing gasket is disposed on the channel step surface,
   wherein the tappet valve comprises a tappet valve step surface,
   wherein when the tappet valve closes the partition channel, the tappet valve step surface presses the sealing gasket.

4. The pneumatic valve control device according to claim 1, further comprising:
   a first elastic driving member configured to drive the first piston to move towards the partition, the first elastic driving member disposed in an air cylinder barrel of the air cylinder,
   wherein when the locking and releasing mechanism releases the first piston, the first elastic driving member accelerate a downward movement of the first piston so as to increase a pressure of air in the air cylinder.

5. The pneumatic valve control device according to claim 4, further comprising:
   a first sealing ring configured to seal the air cylinder barrel of the air cylinder, the first sealing ring disposed on the first piston.

6. The pneumatic valve control device according to claim 1, further comprising:

a second elastic driving member configured to drive the second piston to move downwards, the second elastic driving member disposed in a hydraulic cylinder barrel of the hydraulic cylinder, wherein when the liquid inlet stops supplying water, the second elastic driving member accelerate a downward movement of the tappet valve to close the partition channel so as to reduce an amount of the air discharged through the partition channel.

7. The pneumatic valve control device according to claim 6, further comprising:
a second sealing ring configured to seal the hydraulic cylinder barrel, the second sealing ring disposed on the second piston.

8. The pneumatic valve control device according to claim 1,
wherein the locking and releasing mechanism comprises:
a telescopic pin disposed on an air cylinder barrel of the air cylinder; and
a driving portion configured to drive the telescopic pin to extend and retract, the driving portion connected to the telescopic pin,
wherein the telescopic pin extends along a radial direction of the air cylinder barrel,
wherein when the telescopic pin passes through and extends into the air cylinder barrel, the first piston is locked,
wherein when the telescopic pin is retracted away from the first piston, the first piston is released to fall down.

9. The pneumatic valve control device according to claim 8,
wherein when the locking and releasing mechanism is in an initial state, the telescopic pin is in an extended state.

10. The pneumatic valve control device according to claim 9,
wherein the driving portion comprises a trigger pivotally disposed on the air cylinder barrel,
wherein a first end of the trigger is connected to the telescopic pin, and
wherein a third elastic driving member is connected between a second end of the trigger and the air cylinder barrel.

11. The pneumatic valve control device according to claim 9,
wherein a limiting convex portion is disposed on one side, oriented to the telescopic pin, of the first piston,
wherein a convex portion inclined plane configured to guide the telescopic pin to retract is disposed on the limiting convex portion, and
wherein the convex portion inclined plane gradually and obliquely extends upwardly and inwardly in a direction from the telescopic pin to the limiting convex portion.

12. The pneumatic valve control device according to claim 11,
wherein a bottom surface of the limiting convex portion is a plane.

13. The pneumatic valve control device according to claim 11,
wherein the limiting convex portion is a limiting ring disposed on the first piston.

14. The pneumatic valve control device according to claim 11,
wherein an area of the liquid inlet is larger than an area of the liquid outlet.

15. A method for controlling a pneumatic valve to release water in a water tank of a toilet by using a pneumatic valve control device, the method comprising:
pushing up, by water supplied into a hydraulic cylinder, a second piston of the hydraulic cylinder to generate an upward movement of a piston rod connected to the second piston;
in response to the upward movement of the piston rod, opening an air communication between an air cylinder and an air vent to supply air into the air cylinder and pushing up a first piston disposed in the air cylinder;
stopping a liquid inlet to supply the water into the hydraulic cylinder to allow the second piston to return to an initial position;
releasing, by a locking and releasing mechanism, the first piston to generate a downward movement of the first piston so as to compress the air out of the air cylinder; and
opening, by the compressed air, the pneumatic valve so as to discharge the water from the water tank.

16. The method according to claim 15,
wherein when the second piston is in the initial position, a tappet valve is disposed in a partition channel to close the air communication between the air cylinder and the air vent,
wherein the opening the air communication between the air cylinder and the air vent to supply the air into the air cylinder comprises: in response to the upward movement of the piston rod, moving up the tappet valve so as to leave the partition channel.

17. The method according to claim 15, further comprising:
retracting the locking and releasing mechanism in an extended state to allow the first piston to pass over the locking and releasing mechanism when the first piston is pushed up;
extending the retracted locking and releasing mechanism in a retracted state after the first piston passes over the locking and releasing mechanism so as to lock the first piston when the first piston is pushed up to a preset position.

18. The method according to claim 15,
wherein the releasing, by a locking and releasing mechanism, the first piston comprises: accelerating, by a first elastic driving member, the downward movement of the first piston so as to increase a pressure of the air in the air cylinder.

19. The method according to claim 16, further comprising:
when the liquid inlet stops supplying water, accelerating, by a second elastic driving member, a downward movement of the tappet valve to close the partition channel so as to reduce an amount of the air discharged through the partition channel.

20. The method according to claim 15,
wherein the releasing, by a locking and releasing mechanism, the first piston comprises: compressing a third elastic driving member to retract the locking and releasing mechanism.

* * * * *